F. L. RAPSON.
MEANS FOR SECURING WHEELS ON MOTOR ROAD AND OTHER VEHICLES.
APPLICATION FILED JAN. 29, 1918.

1,409,777.

Patented Mar. 14, 1922.
4 SHEETS—SHEET 1.

INVENTOR
F. L. RAPSON

F. L. RAPSON.
MEANS FOR SECURING WHEELS ON MOTOR ROAD AND OTHER VEHICLES.
APPLICATION FILED JAN. 29, 1918.

1,409,777.

Patented Mar. 14, 1922.
4 SHEETS—SHEET 2.

INVENTOR
F. L. RAPSON

UNITED STATES PATENT OFFICE.

FREDERICK LIONEL RAPSON, OF LIVERPOOL, ENGLAND.

MEANS FOR SECURING WHEELS ON MOTOR ROAD AND OTHER VEHICLES.

1,409,777. Specification of Letters Patent. Patented Mar. 14, 1922.

Application filed January 29, 1918. Serial No. 214,309.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Means for Securing Wheels on Motor Road and other Vehicles, of which the following is a specification.

This invention relates to improvements in means for securing wheels on motor road and other vehicles.

This invention has for its object to provide means whereby a detachable wheel can be easily and quickly removed or placed on the axle hub and be locked in an efficient and effective manner.

A further object is to provide means whereby the detachable wheel can be forced hard on to the ordinary shoulder of the axle hub and to provide a double lock for the said wheel.

A further object is to so arrange the above means that they may be operated by an ordinary crank tool or device, such as used for operating my improved lifting jacks described in my United States Application Serial Number 208,497, filed December 22, 1917, without the use of any secondary devices attached to a wheel spanner as in use at present, the latter only locking the wheel once.

With these and other objects in view the invention consists in providing means to engage and force the detachable wheel on its axle and lock the said wheel thereon upon the operation of a handle or the like.

The invention also consists in providing means whereby the wheel is further locked in its engaged position upon the withdrawal of the said handle or the like.

The invention will now be described with reference to the accompanying drawings, in which:—

Figure 1:
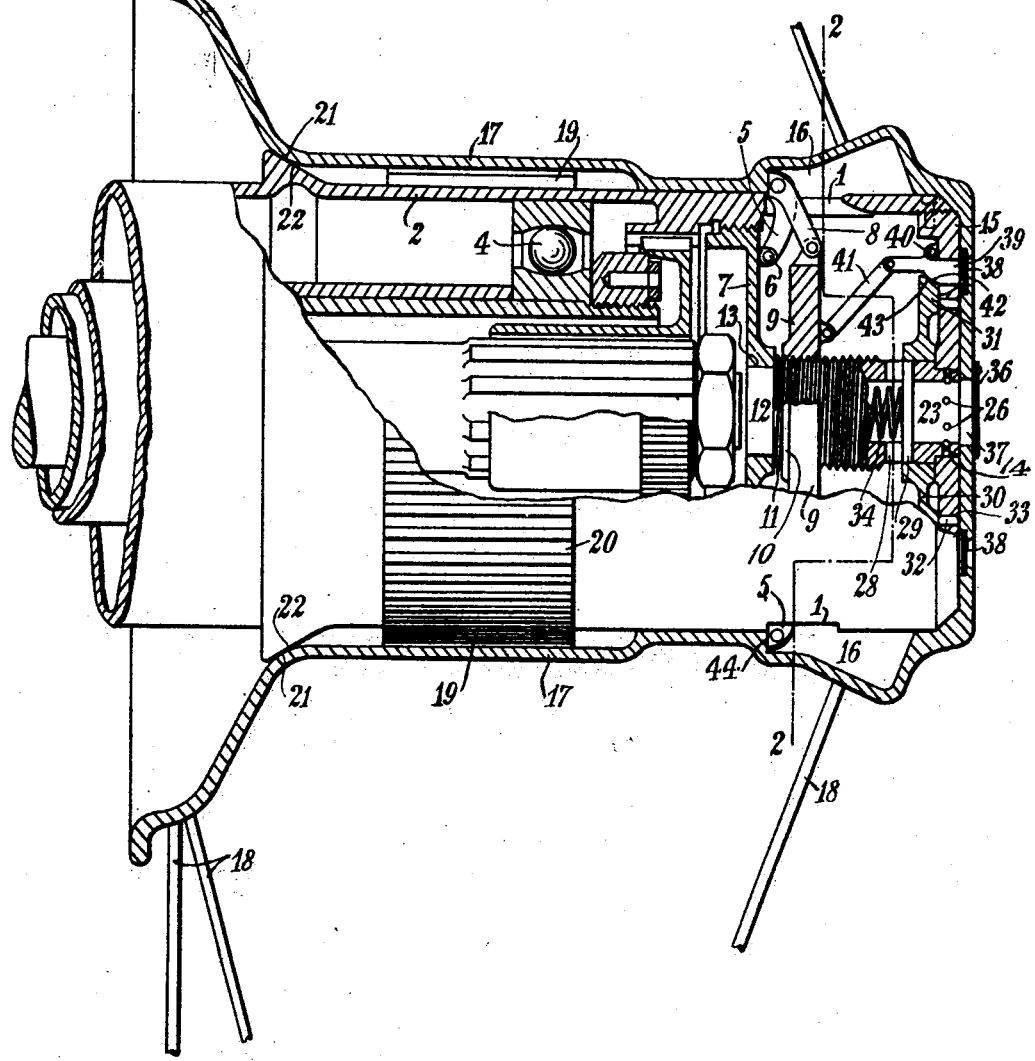
Figure 1 is a sectional side elevation of the axle and wheel hubs showing the wheel in its locked position.
Figure 2:
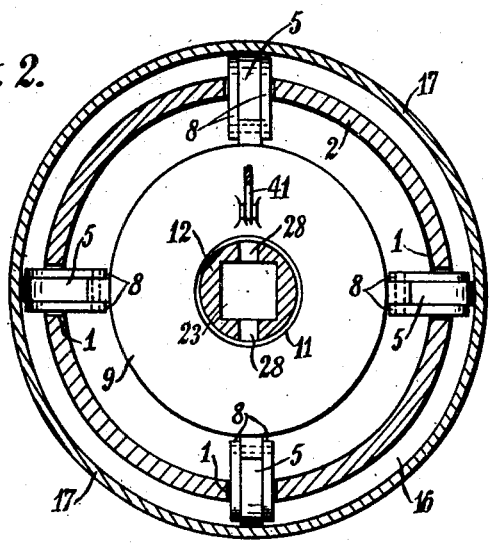
Figure 2 is a sectional front elevation thereof taken on the line 2—2 of Figure 1.

According to one form of this invention and as shown a plurality of preferably four openings 1 are provided around the periphery of the hub 2 usually mounted on the axle 3 through the medium of ball bearings or the like 4. Through each of these openings 1 is adapted to be projected a wheel engaging member 5 which members 5 are pivoted at 6 to a flanged disc 7 adapted to be screwed into the axle hub 2 to retain the lubricating grease and enclose the outer end of the axle 3 and the ball bearing 4. The wheel engaging members 5 are connected by links 8 to a slidable member 9. This member 9 is formed or provided with an internally screw threaded hub 10 and is mounted on a threaded portion 11 of a shaft 12 rotatably mounted at each end in bearings 13 and 14. The inner end of this shaft 12 which is preferably reduced in diameter is mounted in the bearing 13 formed or provided in the cap or flanged disc 7, and the outer end of the shaft 12 is similarly reduced and rotatably mounted in the bearing 14 formed in a disc or cover 15 which is adapted to enclose the outer end of the hub 2. This latter disc or cover 15 is preferably screwed into the outer end of the axle hub 2 and keyed or otherwise secured thereto as will be hereinafter described. The wheel engaging members 5 are adapted to project into a peripheral groove 16 formed in the interior of the hub 17 of a detachable wheel; the spokes 18 of which are shown in the drawings. The hub 17 of the detachable wheel is also provided or formed with axially arranged teeth or serrations 19 to engage with the teeth or serrations 20 usually provided on the hub member 2 to prevent the rotation of the said wheel hub 17 about the said axle hub 2. The inner end of the hub 17 of the detachable wheel is curved upwardly or flanged in the usual manner as shown at 21 to abut against the peripheral projection or shoulder 22 on the end of the axle hub 2 when the said wheel is in its locked position, and the outer end of the axle hub 2 and the interior of the hub 17 are coned or otherwise suitably shaped as shown in the drawings to prevent axial play of the wheel hub when the wheel is locked.

The screwed shaft 12 is formed at its outer end with a squared or other conveniently shaped hole 23 for the reception of the squared portion 24 of a winch handle 25 such as used for operating my improved jacks as previously mentioned. The hub 23 is provided with a plurality of balls 26 which are preferably spring pressed to engage in a groove 27 cut in the squared portion 24 of the handle 25 to detachably retain the said handle in its operative position. Adjacent to this outer end of the shaft 12 are cut oppositely disposed slots or the like 28 in which is adapted to slide a transverse pin or a portion 29 of a disc member 30 disposed on the said shaft 12. This disc member 30 slidably mounted on the said shaft 12 is provided or formed with a flange 31 having a plurality of axially projecting pins 32 to engage in a plurality of apertures 33 formed in the cover disc 15 secured in or on the end of the axle hub 2. Within the shaft 12 is disposed a coiled spring or the like 34 which is adapted to force the extensions 32 on the said disc member 30 into the slots 33 in the cover disc 15 to lock the mechanism when the crank tool 25 is withdrawn.

The wheel hub 17 is preferably flanged at its outer end to provide a cover 35 for the front of the axle hub 2. To this cover 35 is hinged an escutcheon or the like 36 to close a squared operating hole or recess 37 coinciding with the hole 23 in the end of the shaft 12 and prevent the entry of dirt or dust. The cover 35 is also provided with celluloid or like transparent windows 38 through which may be viewed the outer end of a plug 39 to indicate the locked position of the device. This plug 39 which is preferably provided with the word "safe" is pivoted at 40 to the cover 15 and connected at its inner end to the slidable member 9 by a toggle link or the like 41. The plug 39 is shaped at 42 to engage in a groove or recess 43 provided in the disc member 30.

Figure 3:
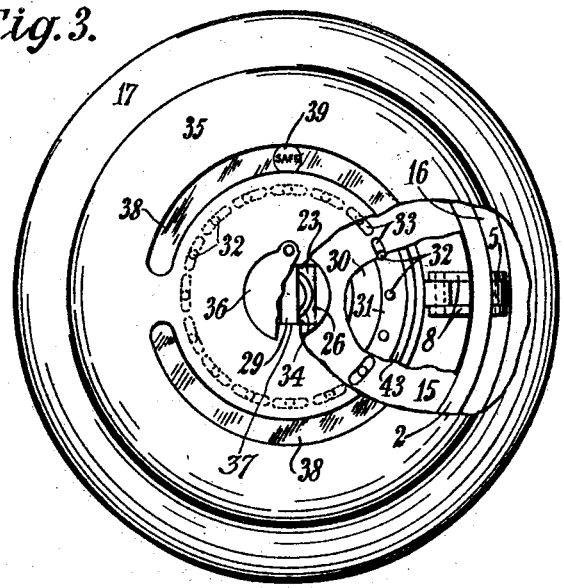
Figure 3 is a front elevation with parts broken away to show the wheel locking mechanism.
Figure 4:
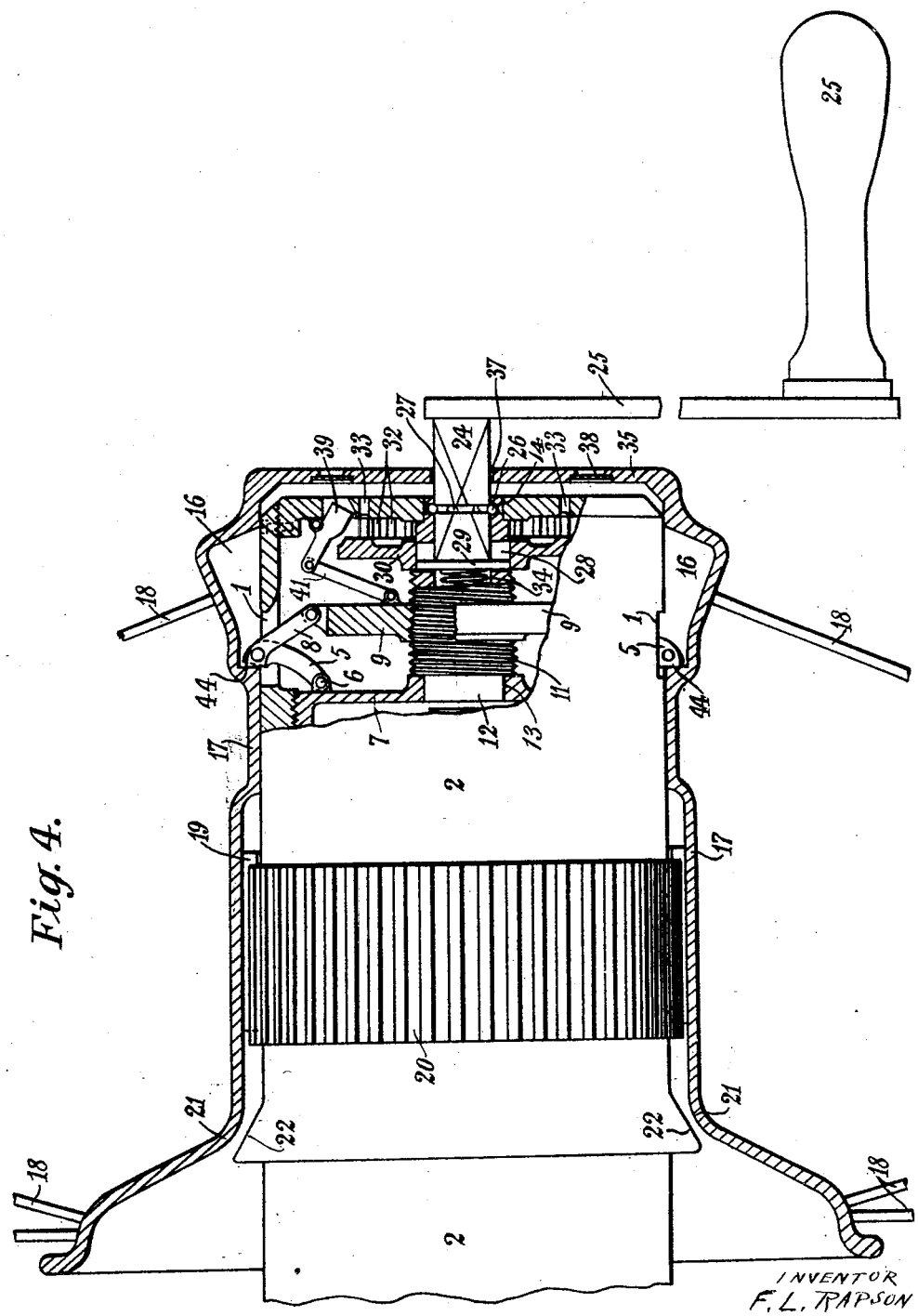
Figure 4 is a similar view to Figure 1 showing the wheel about to be forced in position.
Figure 5:
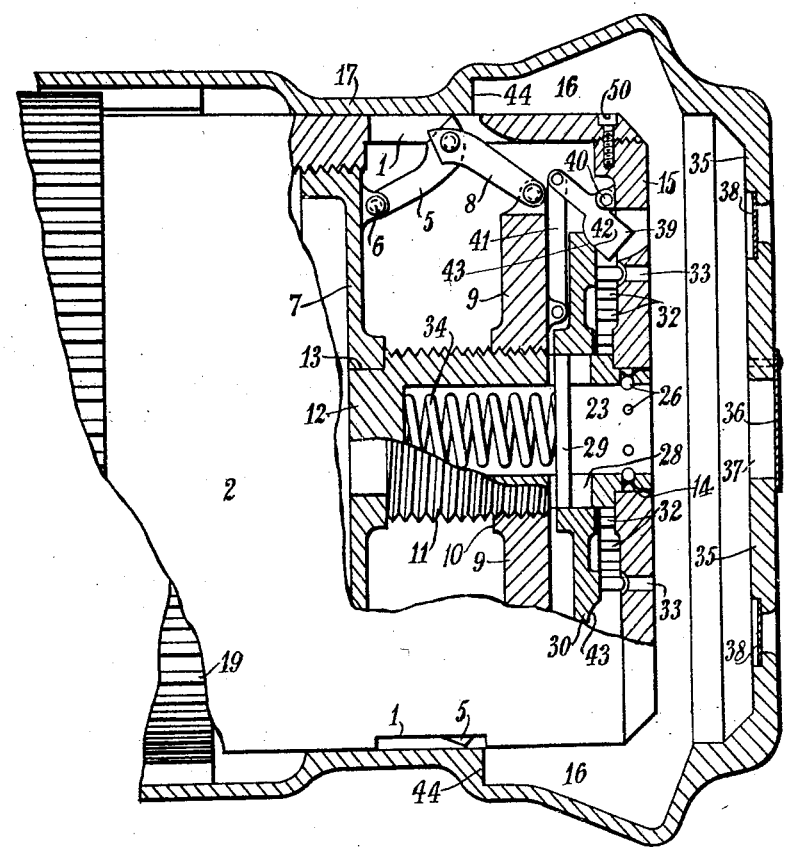
Figure 5 is an enlarged part sectional side elevation showing the wheel partly removed.

In operation and when it is desired to mount the detachable wheel on the axle hub 2, the said wheel is placed on the axle hub 2 in the usual manner so that the teeth or serrations 19 and 20 on the wheel and axle hubs 17 and 2 respectively are engaged to prevent relative rotation as shown in Figure 5. The squared portion 24 of the crank tool 24—25 is placed through the hole 37 (Fig. 3) in the wheel member and then inserted in the squared recess 23 in the shaft 12 and forced inwardly to engage the pin extension 29 and slide the disk 30 against the action of the spring 34. As shown in Fig. 5, the nut lock device, including the disc 30, the pin extension 29 and the pins 32 is in inoperative position, when the wheel hub is first placed on the main hub. In other words, at this time in assembling the hubs the pins 32 have not engaged in the apertures 33 in the covered disc 15, the plug 39 engaging the disc 30, holding the pins 30 out of the apertures 33, permitting a free rotation of the shaft 12 by the crank tool 24—25. The handle 25 of said tool is then turned to rotate the shaft 12 and slide the member 9 inwardly on the threaded portion 11 of the said shaft 12, to force the wheel engaging members 5 through the slots 1 in the axle hub 2 into the groove 16 in the wheel hub 17. Upon further rotation of the operating tool by the handle 25 the outer ends of the wheel engaging members 5 will be moved along their slots 1, through the medium of the links 8 and member 9, to engage an inwardly projecting flange 44 formed on the interior of the wheel hub 17 as shown in Figure 4. This action will force the detachable wheel on the axle hub 2 so that the flange 21 on the former will abut against the peripheral rib or shoulder 22 on the latter and the interior shaped end of the wheel against the cone shaped end of the axle hub to firmly secure and lock the wheel 18 in position. When the operating tool 24—25 is removed the spring 34 will force locking pins 32 of the disc 30 into the apertures 33 in the cover disc 15. Thus the wheel is provided with a double lock, that is, the wheel hubs are locked together by rotation of the shaft 12 and the connections therebetween and the locking members 5 and by means of the lock nut devices 29—30—32—33, before described, the rotatable shaft 12 is held against rotation and the first mentioned locking means thereby locked against accidental operation. The plug 39 will be moved back to its normal position by the slidable member 9 through the medium of the link 41 and show the word "safe" through the window 38 as shown in Figures 1 and 3. The engaged or locked position of the locking pins 32 will be indicated by the plug 39 which is brought flush with the outer face of the cover disc 15 by the link 41 as stated. The cover or escutcheon 36 can now be placed over the hole 37 of the cover 35.

When it is desired to remove the wheel the handle 25 is again inserted in hole 23 in the centre of the hub, to disengage the locking pins 32 and rotated in the opposite direction. The rotation of the screwed shaft 12 by the handle 25 will slide the member 9 forwardly towards the cover disc 15 and the wheel engaging members 5 will be withdrawn and moved inwardly through the medium of the links 8 connecting the members 5 to the member 9. The detachable wheel is thus unlocked and ready to be withdrawn off its axle hub 2. The plug 39 will also be removed from its opening in the cover disc 15 to indicate that the wheel is unlocked.

Thus the wheel can be detached or fixed to the axle hub and be efficiently locked in the minimum amount of time or exertion on the part of the operator.

In order to allow the wheel engaging and locking device above described to be easily removed, so that the ball bearing mechanism can be got at when required the flnged disc 7 and the disc or cover 15 are threaded to screw into the hub 2 as shown. The discs 7 and 15 are provided with holes 45 into which any suitable device is adapted to be placed to turn the said disks. Thus the whole device can be easily and quickly removed by unscrewing the said discs. The disc or cover 15 of the device is secured and locked in the axle hub 2 by a set screw or the like 50.

What I claim is:—

1. In a wheel, a main hub having a hollow portion provided with openings opening laterally outwardly through the sides of the main hub, a wheel hub slidable on the main hub, devices pivoted at one end within the hollow portion of the main hub, and means mounted within the hollow portion of the main hub and operable for sliding movement therein and having pivotal connections with the outer ends of the aforesaid pivoted devices to swing said pivoted devices outwardly through the openings of the main hub into engagement with the interior of the wheel hub to force the latter inwardly in a longitudinal direction into operative position on the main hub.

2. In a wheel, a main hub having a hollow portion and an exterior annular shoulder adjacent its inner end and provided adjacent its outer end with openings leading outwardly from the hollow portion thereof, a wheel hub having an internal annular shoulder, a rotatable exteriorly screw threaded shaft journaled in the hollow portion of the main hub, a member having screw threaded connection with said exteriorly screw threaded shaft, locking devices pivotally mounted within said hollow portion of the main hub, and connections between said member and said pivoted locking devices so that upon rotation of said rotatable shaft in one direction said member is caused to slide along said shaft and force said pivoted locking devices and the connections between the latter and said slidable member outwardly of the hollow portion of the main hub through the aforesaid openings in the latter into engagement with said internal shoulder of the wheel hub to force the inner end of the latter tightly onto the aforesaid shoulder of the main hub.

3. In a wheel, a wheel hub provided with an internal shoulder adjacent its inner end and having an aperture in its outer end to receive an operating tool, a main hub having a hollow portion adjacent its outer end and also having openings leading through the side walls thereof from said hollow portion, the main hub also having an external annular shoulder adjacent its inner end, a hollow rotatable exteriorly screw threaded shaft journaled in the main hub and having its hollow portion at its outer end squared interiorly and coinciding with the aforesaid aperture in the outer end of the wheel hub to receive the tool passed through the aforesaid wheel hub aperture whereby to rotate said rotatable member, a member having screw threaded connection with said shaft, locking members pivotally mounted in the hollow portion of the main hub, connections between said member on the rotatable shaft and said locking members so that upon rotation of said rotatable shaft in one direction said member on the rotatable shaft is caused to slide along said shaft and project said locking members and the connections between the latter and the said slidable member outwardly through the aforesaid openings in the side walls of the main hub into engagement with the aforesaid internal annular shoulder of the wheel hub to force the inner end of the wheel hub onto the aforesaid external shoulder of the main hub and hold the hubs locked together, and spring controlled means adapted to lock the aforesaid rotatable shaft against accidental rotation.

4. In a wheel, a wheel hub provided with an internal annular shoulder adjacent its inner end and having an aperture in its outer end to receive an operating tool, a main hub having a hollow portion adjacent its outer end and also having openings leading through the side walls thereof from said hollow portion, the main hub also having an external annular shoulder adjacent its inner end, a hollow rotatable exteriorly screw threaded shaft journaled in the main hub and having its hollow portion at its outer end squared interiorly and coinciding with the aforesaid aperature in the outer end of the wheel hub to receive the aforesaid tool whereby to rotate said rotatable member, a member having screw threaded connection with said shaft, locking members pivotally mounted in the hollow portion of the main hub, connections between said member on the rotatable shaft and said locking members so that upon rotation of said rotatable shaft in one direction said member on the rotatable shaft is caused to slide along said shaft and project said locking members and the connections between the latter and the said slidable member outwardly through the aforesaid openings in the main hub into engagement with the aforesaid internal annular shoulder of the wheel hub to force the inner end of the wheel hub onto the aforesaid shoulder of the main hub and hold the hubs locked together, and spring controlled means adapted to lock the aforesaid rotatable shaft against accidental rotation, said spring controlled means being normally effective for locking purposes and being held out of operative locking position during the operation of forcing the wheel hub into the aforesaid operative locked position on the main hub.

5. In a wheel, a wheel hub provided with an internal annular shoulder adjacent its outer end and having an aperture in its outer end to receive an operating tool, a main hub having a hollow portion adjacent its outer end and also having openings leading through the side walls thereof from said hollow portion, the main hub also having an external annular shoulder adjacent its inner end, a hollow rotatable exteriorly screw threaded shaft journaled in the main hub and having its hollow portion at its outer end squared interiorly and coinciding with the aforesaid aperture in the outer end of the wheel hub to receive the tool passed through the aforesaid wheel hub aperture whereby to rotate said rotatable member, a member having screw threaded connection with said shaft, locking members pivotally mounted in the hollow portion of the main hub, connections between said member on the rotatable shaft and said locking members so that upon rotation of said rotatable shaft in one direction said member on the rotatable shaft is caused to slide along said shaft and project said locking members and the connections between the latter and the said slidable member outwardly through the aforesaid openings in the side walls of the main hub into engagement with the aforesaid internal annular shoulder of the wheel hub to force the inner end of the wheel hub onto the aforesaid external shoulder of the main hub and hold the hubs locked together.

6. In a wheel, a wheel hub having an opening in its outer end, a main hub having a hollow portion and openings leading therefrom, devices operable from the interior of the main hub for projection outwardly through the openings in the main hub into engagement with the wheel hub for forcing the latter to operative position with relation to the main hub and for locking said hubs together, a lock nut device mounted within the main hub for effecting a locking of the aforesaid forcing and locking means, and a hand operated device for insertion through the aforesaid opening of the wheel hub to throw said lock nut device out of normal locking position to actuate the forcing and locking means as aforesaid, said lock nut device assuming automatically its locking position upon withdrawal of said hand operated device through the opening in the outer end of the wheel hub.

7. In a wheel, a wheel hub having an opening in its outer end, a main hub, a locking means arranged within and operable from within the main hub to effect a movement of the wheel hub into operative position on the main hub and to lock the hubs together, a lock nut device mounted in the main hub and constructed and arranged to lock the locking means against operation, and a hand operated device constructed for insertion into the hubs through said opening in the wheel hub to actuate the lock nut device and throw and hold it out of operative condition to permit of an actuation by said tool of the aforesaid holding and locking means, said lock nut device operating automatically for the aforesaid locking purpose upon withdrawal of the hand operated device through said opening.

8. In a wheel, a main hub, said main hub having a hollow portion, a rotatable exteriorly screw threaded shaft journaled within the main hub, the main hub having an exterior annular shoulder adjacent its inner end, said main hub having openings leading outwardly from the hollow portion thereof, a wheel hub provided with an internal annular shaft, a member slidably mounted on the exteriorly screw threaded shaft, locking members pivotally mounted within the main hub, connections between the said slidable member on the rotatable shaft and said locking members so that upon rotation of said rotatable shaft in one direction said slidable member is moved along said shaft and said locking members and said connections between the locking members and the slidable member are forced outwardly through the openings in the main hub into engagement with the internal shoulder of the wheel hub to force the inner end of the wheel hub onto the aforesaid shaft of the main hub and lock the hubs together.

9. In a wheel, a main hub, said main hub having a hollow portion, a rotatable exteriorly screw threaded shaft journaled in the main hub, the main hub having an exterior annular shoulder adjacent its inner end, said main hub having openings leading outwardly from the hollow portion of the main hub, a wheel hub provided with an internal annular shoulder, a member slidably mounted on the exteriorly screw threaded shaft, locking members pivotally mounted in the main hub, connections between the said slidable member on the rotatable shaft and said locking members so that upon rotation of said slidable shaft in one direction said slidable member is moved along said shaft and said locking members and said connections between the locking members and the slidable member are forced outwardly through the openings in the main hub into engagement with the internal shoulder of the wheel hub to force the inner end of the wheel hub onto the aforesaid shoulder of the main hub and lock the hubs together, an independent locking means coacting with the aforesaid locking means, and indicating devices confined within the hubs and operable under the influence of movement of said slidable member to different positions to indicate whether the first mentioned locking means is in operative or inoperative position.

10. In a wheel, a main hub, said main hub having a hollow portion, a rotatable exteriorly screw threaded shaft journaled in the main hub, the main hub having an exterior annular shoulder adjacent its inner end, said main hub having openings leading outwardly from the hollow portion of the main hub, a wheel hub provided with an internal annular shoulder, a member slidably mounted on the exteriorly screw threaded shaft, locking members pivotally mounted in the main hub, connections between the said slidable member on the rotatable shaft and said locking members so that upon rotation of said rotatable shaft in one direction said slidable member is moved along said shaft and said locking members and said connections between the locking members and the slidable member are forced outwardly through the openings in the main hub into engagement with the internal shoulder of the wheel hub to force the inner end of the wheel hub onto the aforesaid shoulder of the main hub to lock the hubs together, and indicating devices to indicate whether the locking means is in operative or inoperative position.

In testimony whereof I have hereunto signed my name.

FRED. LIONEL RAPSON.